United States Patent
Roth

(10) Patent No.: US 7,963,379 B2
(45) Date of Patent: Jun. 21, 2011

(54) SIDE BAG FOR MOTORCYCLES

(75) Inventor: Ingo Roth, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1170 days.

(21) Appl. No.: 11/637,672

(22) Filed: Dec. 13, 2006

(65) Prior Publication Data

US 2007/0102469 A1 May 10, 2007

Related U.S. Application Data

(63) Continuation of application No. PCT/EP2005/006606, filed on Jun. 18, 2005.

(30) Foreign Application Priority Data

Jul. 9, 2004 (DE) .......................... 10 2004 033 688

(51) Int. Cl.
*B62J 9/00* (2006.01)

(52) U.S. Cl. ........ 190/119; 190/100; 190/104; 190/105; 190/103

(58) Field of Classification Search .................. 190/119, 190/100, 104, 105, 103; 206/320, 8; 224/148.3, 224/153, 413, 429, 585
See application file for complete search history.

(56) References Cited

U.S. PATENT DOCUMENTS

| 1,756,775 | A | * | 4/1930 | Frederi | 292/281 |
| 1,963,333 | A | | 6/1934 | Morales | |
| 2,527,433 | A | * | 10/1950 | La Rochelle | 224/423 |
| 2,562,499 | A | * | 7/1951 | Lifton | 29/428 |
| 3,443,671 | A | * | 5/1969 | Dyke | 190/103 |
| 4,128,150 | A | * | 12/1978 | Popkin et al. | 190/103 |
| 4,241,857 | A | * | 12/1980 | Perethian et al. | 224/413 |
| 4,629,040 | A | * | 12/1986 | Jones | 190/102 |
| 4,907,728 | A | * | 3/1990 | Giblet | 224/585 |
| 5,056,695 | A | * | 10/1991 | Giblet | 224/484 |
| 5,324,115 | A | * | 6/1994 | Weinreb | 383/2 |
| 5,497,919 | A | | 3/1996 | Klinger | |
| 5,671,831 | A | * | 9/1997 | Chiu | 190/103 |
| 6,223,960 | B1 | * | 5/2001 | Powell et al. | 224/429 |
| 6,338,260 | B1 | * | 1/2002 | Cousins et al. | 70/2 |
| 6,484,911 | B1 | | 11/2002 | Doler et al. | |
| 6,505,765 | B1 | * | 1/2003 | Proctor et al. | 224/413 |
| 6,547,114 | B2 | * | 4/2003 | Smith | 224/413 |

(Continued)

FOREIGN PATENT DOCUMENTS

CN 2306933 2/1999

(Continued)

OTHER PUBLICATIONS

Notification of First Office Action issued by the People's Republic of China dated Apr. 4, 2008.

(Continued)

*Primary Examiner* — Anthony Stashick
*Assistant Examiner* — Cynthia F Collado
(74) *Attorney, Agent, or Firm* — Crowell & Moring LLP

(57) ABSTRACT

Saddlebag for motorcycles, having a luggage interior part facing the motorcycle in the installed state, a luggage exterior part facing away from the motorcycle in the installed state and which is mounted for opening and closing the saddlebag so it can pivot with respect to the luggage interior part. A flexible luggage intermediate part is situated between the luggage interior part and the luggage exterior part.

20 Claims, 2 Drawing Sheets

U.S. PATENT DOCUMENTS

| | | |
|---|---|---|
| 6,840,417 B2 | 1/2005 | Heinrich et al. |
| 7,144,070 B2 * | 12/2006 | Wiebe et al. ............... 296/185.1 |
| 2003/0000784 A1 | 1/2003 | Hsu |
| 2005/0040613 A1 * | 2/2005 | Williams et al. ................ 280/30 |
| 2008/0178642 A1 * | 7/2008 | Sanders ............................ 70/64 |

FOREIGN PATENT DOCUMENTS

| | | |
|---|---|---|
| CN | 1509929 | 7/2004 |
| DE | 84 05 114.0 U1 | 5/1984 |
| DE | 88 11 688.3 U1 | 1/1989 |
| DE | 43 31 076 A1 | 3/1995 |
| DE | 94 20 745.3 U1 | 4/1995 |
| DE | 202 12 566 U1 | 12/2002 |
| DE | 101 50 055 A1 | 5/2003 |
| EP | 1 431 167 A2 | 6/2004 |
| GB | 734278 | 7/1955 |

OTHER PUBLICATIONS

Notification of Second Office Action issued by the People's Republic of China dated Dec. 12, 2008.

International Search Report dated Jun. 18, 2005 with English translation of relevant portion (Nine(9) pages).

German Search Report dated Jan. 28, 2005 with English translation of pertinent portion (Eight (8) pages).

* cited by examiner

SIDE BAG FOR MOTORCYCLES

This application is a Continuation of PCT/EP2005/006606, filed Jun. 18, 2005, and claims the priority of DE 10 2004 033 688.1, filed Jul. 9, 2004, the disclosures of which are expressly incorporated by reference herein.

BACKGROUND AND SUMMARY OF THE INVENTION

The present invention relates to a saddlebag for motorcycles.

Most motorcycle saddlebags are made of two luggage shells manufactured by the injection molding process. They therefore have a fixedly defined volume. If they are only partially loaded, the items loaded into the bag may cause rattling noises and may slip, which could even have a negative effect on driving stability. Another disadvantage of saddlebags having a volume that is fixed, i.e., not adjustable, is that one must always drive with maximum air resistance even with a small load.

As an alternative, there are also luggage containers that are made of leather or textile and can be mounted on the side in the rear end of the motorcycle. However, such luggage containers have a low stiffness, a relatively limited service load and offer very little protection from theft. Furthermore, they become deformed due to the weight of the load goods and due to wind forces, which can have a negative effect on driving stability.

The object of the present invention is to create a motorcycle saddlebag which is variable in volume and with which these disadvantages are avoided.

This object is achieved through the features, embodiments and refinements of the invention discussed below.

The invention relates to a motorcycle saddlebag having a luggage interior part and a luggage exterior part. When the saddlebag is mounted in the lateral area of the rear end of the motorcycle, the interior part of the luggage is facing toward the motorcycle and the exterior part of the luggage is facing away from the motorcycle. To open and close the saddlebag, the luggage exterior part can be pivoted with respect to the luggage interior part.

The core of the present invention consists of arranging a "flexible luggage intermediate part" between the luggage interior part and the luggage exterior part. When the saddlebag is closed, the luggage intermediate part connects the luggage interior part to the luggage exterior part. Owing to the flexibility of the luggage intermediate part, the load volume of the saddlebag can be adapted to the actual volume of the load goods. When there is a minimal load, the interior and exterior luggage halves may be collapsed almost entirely, i.e., the luggage exterior part is essentially in direct contact with the luggage interior part. If a larger load volume is needed, the luggage interior part and the luggage exterior part may each be pivoted apart as needed. The "interspace" between the luggage interior part and the luggage exterior part is "bridged" by the flexible luggage intermediate part. The luggage intermediate part may be made of a relatively flexible "film-like material," a fabric, i.e., textile material, in particular a coated fabric and/or textile material or the like and may be sewn to the luggage exterior part or otherwise attached to the luggage exterior part, e.g., by gluing. As in the case of bellows, the luggage intermediate part may be prefolded. However, a bellows-like "prefolding" is not absolutely necessary.

To keep the saddlebag closed during a trip, at least one tension element is provided. Preferably two tension elements are provided, extending from the luggage exterior part over the luggage intermediate part to an upper area of the luggage interior part, tying down the luggage exterior part and the luggage interior part. These tension elements may be in the form of tension belts. The one tension element may be arranged in a front area of the saddlebag and the other tension element may be arranged in a rear area of the saddlebag. Depending on the required load volume, the luggage interior part and the luggage exterior part are in different pivot positions to one another. The length of the tension elements and the luggage intermediate part are mutually coordinated accordingly. When a large load volume is required, the tension elements must bridge a greater tension length than is the case when only a small load volume is required. To this end, the tension elements can be extended in length, as explained in greater detail below.

Receptacle openings into which the tension elements can be inserted are provided on the luggage interior part. Latch-like elements are provided on the ends of the tension elements facing the luggage interior part. They may be inserted into the receptacle openings provided on the luggage interior part and may be engaged in catch mechanisms provided there.

As already mentioned, the tension elements may have a belt-like and/or strap-like shape. The tension elements are preferably relatively flat "plastic belts" that are reinforced by an injected cable. The cables may be, for example, steel cable, thereby allowing very high tension and/or stretching forces to be transmitted.

The luggage interior part may be designed as a "load-bearing plastic shell" like traditional saddlebags. The luggage exterior part may also be made of plastic. As an alternative to this, the luggage exterior part may be made of a textile material. The luggage exterior part preferably has a lower stiffness than the luggage interior part so it can easily be shaped by hand. The luggage intermediate part has a low stiffness in comparison with the luggage interior part and the luggage exterior part so it is relatively flexible. For example, it may be made of plastic or a textile material.

The flexible luggage intermediate part is preferably reinforced by a sheathing. The sheathing may be, for example, a wire cable insert, a wire cloth and/or a wire mesh that is an integral component of the luggage intermediate part. If the luggage intermediate part is made of plastic, the sheathing may be integrally injected and/or cast in the plastic. If the luggage intermediate part is made of a textile, the sheathing may be woven into the textile or may be bonded to the inside surface of the luggage intermediate part, e.g., by gluing or sewing. The risk of damage to the luggage intermediate part is reduced by the sheathing. In addition this also improves the theft security because the luggage intermediate part cannot easily be cut and/or torn open.

For design reasons, the luggage exterior part should experience little or no deformation during use. To improve the "stability" of the luggage exterior part, a reinforcing element may be arranged on the outside of the luggage exterior part, extending partially around the luggage exterior part from the outside. The reinforcing element may be made of plastic. The reinforcing element preferably has two "belt-like sections" which extend upward from the bottom side of the luggage exterior part to the top side of the luggage exterior part. In the upper area of the luggage exterior part, the belt-like sections of the reinforcing element are each connected to one of the tension elements. The belt-like sections may thus be interpreted as "lengthened" tension elements. The tension elements may have a catch engagement, e.g., resembling a row of teeth such as that known from toothed rods, on its side facing the luggage exterior part and/or the luggage intermediate part. On the inside of the belt-like sections, catch engagement devices, e.g., catch latches into which the catches of the tension elements can be engaged may be provided. The tension elements are therefore connected to the belt-like sections so that they are "adjustable in length."

To further improve the stability of the luggage exterior part, the reinforcing element may have a belt-like section that extends forward across the two belt-like sections mentioned first from the rear side of the luggage exterior part to the front side of the luggage exterior part. If the reinforcing element is an injection molded plastic part, the two belt-like sections running upward may be joined together in one piece by the belt-like section running in the longitudinal direction of the saddlebag. The reinforcing element is preferably rigid, in particular more rigid than the luggage exterior part.

As already mentioned, for opening and/or closing the saddlebag, the luggage exterior part may be pivoted with respect to the luggage interior part. To do so, the luggage exterior part may be attached directly to the luggage interior part by a hinge. As an alternative or in addition to that, it is also possible for the hinge(s) to be arranged on the lower end of the belt-like sections of the reinforcing element.

Other objects, advantages and novel features of the present invention will become apparent from the following detailed description of the invention when considered in conjunction with the accompanying drawings.

DETAILED DESCRIPTION

Figure 1:
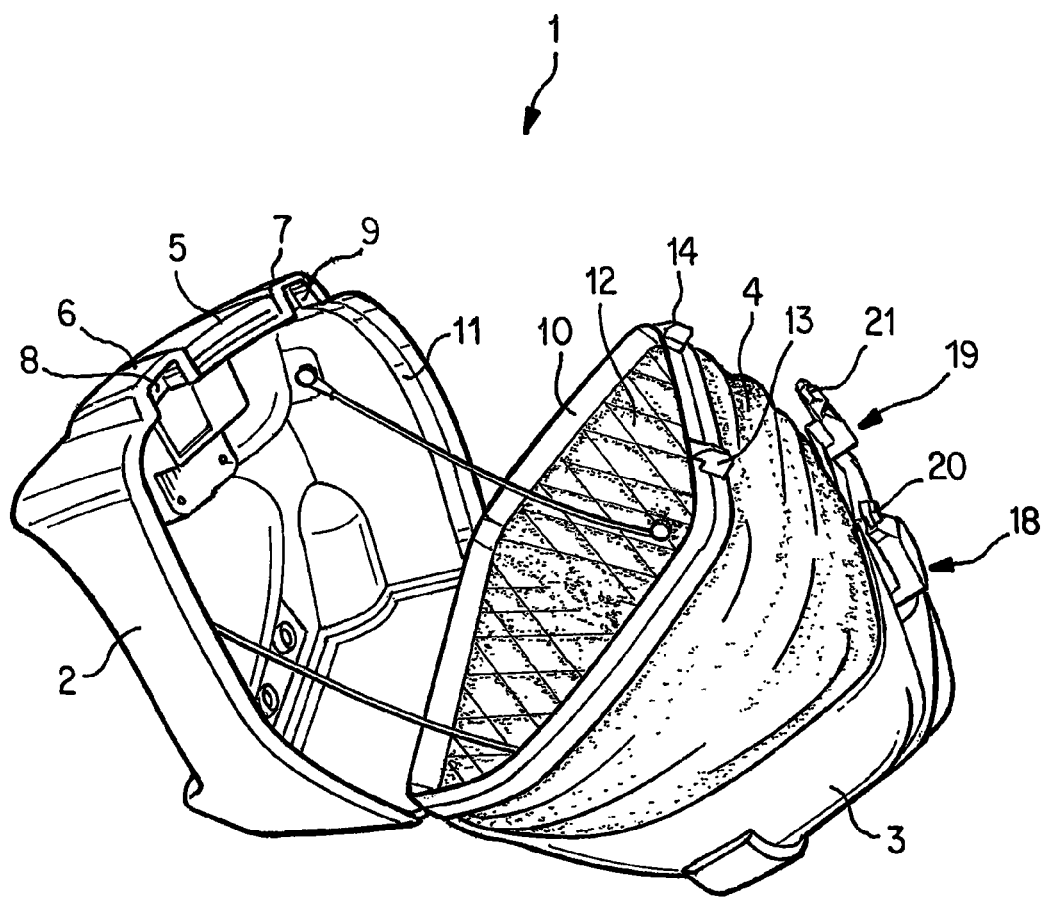
FIG. 1 shows a saddlebag according to an embodiment of this invention in an opened condition.

FIG. 1 shows a saddlebag 1 comprising a luggage interior part 2, a luggage exterior part 3 and a luggage intermediate part 4. When the saddlebag 1 is mounted on the side of the motorcycle in the rear end area of the motorcycle, the luggage interior part 2 faces the motorcycle and the luggage exterior part 3 faces away from the motorcycle. The luggage interior part 2 is an essentially rigid plastic shell with a handle 5 provided on its top side. Receptacle openings 6, 7 are provided on the top side of the luggage interior part 2 with a first and/or second catch engagement 8, 9 arranged therein.

The luggage intermediate part 4 is made of a plastic-coated waterproof textile material that is relatively flexible. On the side facing the luggage internal part 2, the luggage intermediate part 4 has a comparatively rigid frame 10, the shape of which corresponds to the shape of the luggage interior part 2 in an exterior edge area 11. The luggage intermediate part 4 is reinforced by a wire mesh 12. The wire mesh 12 may be woven into the weave of the luggage intermediate part 4 or it may be glued to the inside of the luggage intermediate part 4. The wire cloth 12 functions as a sheathing. Two catch hooks 13, 14 that are provided on the top side of the frame 10 of the luggage intermediate part 4, can be inserted into the catch mechanisms 8, 9.

As illustrated in FIG. 1, the outer end of the luggage intermediate part 4 is fixedly connected to the luggage exterior part 3. For example, it may be sewn onto the luggage exterior part 3.

Figure 3:
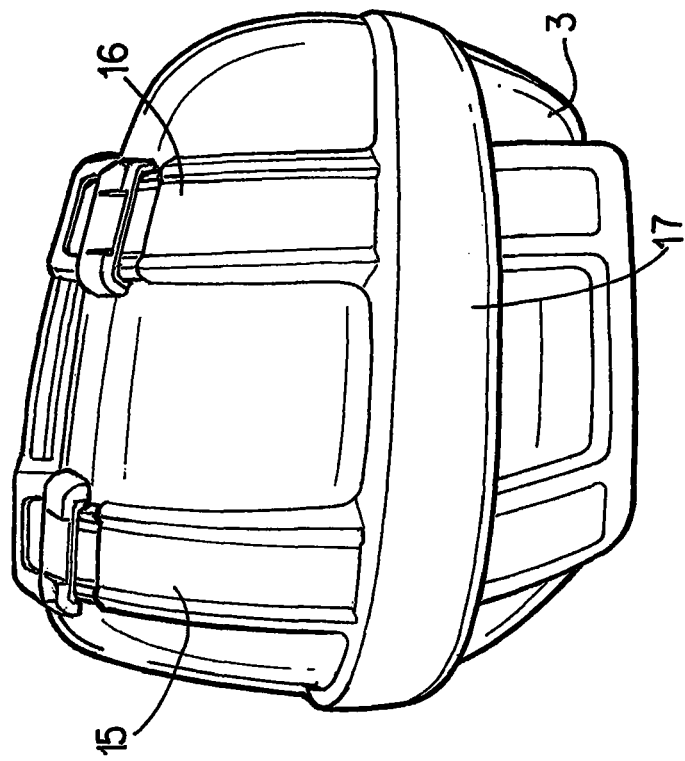
FIG. 3 shows a side view of the saddlebag from FIG. 1 and FIG. 2.
Figure 2:
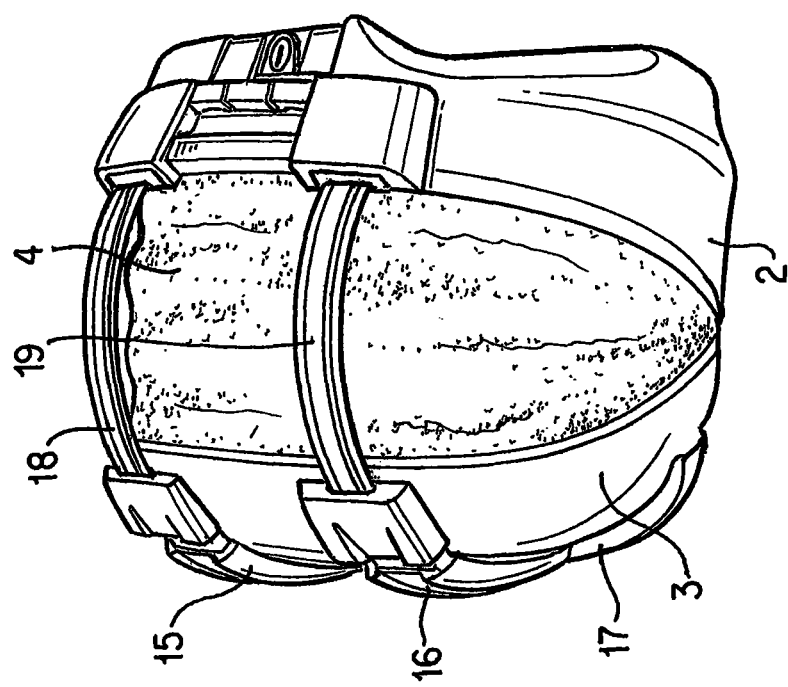
FIG. 2 shows the saddlebag from FIG. 1 in a closed condition.

As shown best in FIG. 2 and FIG. 3, a reinforcing element is provided on the outside of the luggage exterior part 3, said reinforcing element having a first and second belt-like section 15, 16 and a transverse section 17. The belt-like sections 16, 17 each extend from an underside of the luggage exterior part 3 up to the area of the top side of the luggage exterior part 3. The transverse section 17 connects the two belt-like sections 15, 16 and extends from one rear side in the longitudinal direction of the saddlebag 1 toward the front side thereof. The reinforcing element with its belt-like sections 15, 16 and the transverse section 17 is made of plastic. It extends around the luggage exterior part 3 from the outside like a clamp and thereby retains the shape of the luggage exterior part 3. The belt-like sections 15, 16 are concave as seen from the luggage exterior part 3. Their concave insides each form a "receiving channel" for the ends of the respective belt-like tension elements 18, 19. The tension elements 18, 19 have a catch mechanism, e.g., a row of teeth in their longitudinal direction. The ends of the tension elements 18, 19 are inserted into the respective catch mechanisms which are arranged on the inside of the belt-like sections 15, 16 facing the luggage exterior part. The catch mechanisms allow a relative displacement of the tension elements 18, 19 with respect to the belt-like sections 15, 16 and thus allow on-demand "length adjustment" of the tension elements 18, 19 according to the particular load volume demand.

In the open position of the saddlebag 1 shown in FIG. 1, the tension elements 18, 19 are inserted into the receiving channels of the belt-like sections 15, 16. When the saddlebag 1 is to be closed, the luggage exterior part 3 is swung in the direction of the luggage interior part 2. Then the catch hooks 13, 14 first engage in the catch mechanisms 8, 9. Then latch-like elements 20, 21 (see FIG. 1) which are provided on the ends of the tension elements 18, 19, are engaged in the catch mechanisms, thereby "locking" the saddlebag 1. Next the luggage exterior part 3 can also be pressed in the direction of the luggage interior part 2 whereby the rows of teeth (not shown) that are provided on the tension elements 18, 19 slip like a ratchet over the catch mechanisms provided on the belt-like sections 15, 16. Thus the saddlebag 1 can be pushed onto the load volume that is actually needed. For opening the saddlebag 1, a "lock release" (not shown here) by means of which the catch mechanisms 8, 9 can be unlocked is provided on the top side of the luggage interior part 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A saddlebag for a motorcycle, comprising:
   a luggage interior part that faces the motorcycle in an installed state;
   a luggage exterior part which faces away from the motorcycle in the installed state;
   at least one tension element extendable from one of the luggage exterior part and the luggage interior part to the other of the luggage exterior part and the luggage interior part; and
   a luggage intermediate part made of a flexible material,
   wherein the luggage exterior part is pivotable with respect to the luggage interior part for opening and closing the saddlebag,
   the at least one tension element is configured to maintain a user-selected separation distance between an upper edge of the luggage interior part and an upper edge of the luggage exterior part when a latch end of the at least one tension element is affixed to the at least one of the luggage exterior part and the luggage interior part, the user-selected separation distance being variable at any position between a fully open position and a fully closed position, and the luggage intermediate part is configured to close the user-selected distance between the luggage interior part and the luggage exterior part.

2. The saddlebag as claimed in claim 1, wherein the at least one tension element includes a front tension element and a rear tension element.

3. The saddlebag as claimed in claim 2, wherein the luggage interior part has catch mechanisms engageable by latch-like elements provided on the latch ends of the tension elements.

4. The saddlebag as claimed in claim 2, wherein the at least one tension element has a belt-like shape.

5. The saddlebag as claimed in claim 4, wherein the at least one tension element is made of plastic, and at least one steel cable is embedded in the plastic.

6. The saddlebag as claimed in claim 1, wherein the luggage intermediate part has a sheathing.

7. The saddlebag as claimed in claim 6, wherein the sheathing is formed by at least one of a wire cable mesh and a wire cable cloth.

8. The saddlebag as claimed in claim 1, wherein the luggage interior part has an essentially rigid plastic shell.

9. The saddlebag as claimed in claim 1, wherein the luggage exterior part is made of an elastic material that is more rigid than the luggage intermediate part.

10. The saddlebag as claimed in claim 1, wherein the luggage intermediate part is made of a textile material.

11. The saddlebag as claimed in claim 9, wherein the luggage exterior part is made of a textile material.

12. The saddlebag as claimed in claim 1, wherein the luggage intermediate part is connected pivotably via a hinge to the luggage interior part.

13. The saddlebag as claimed in claim 3, further comprising at least one reinforcing element,
wherein the at least one reinforcing element extends around an outside of the luggage exterior part.

14. The saddlebag as claimed in claim 13, wherein the at least one reinforcing element is connected via at least one hinge to the luggage interior part.

15. The saddlebag as claimed in claim 13, wherein the at least one reinforcing element includes two belt-like sections extending from the bottom side of the luggage exterior part upward to the top side of the luggage exterior part.

16. The saddlebag as claimed in claim 15, wherein the two belt-like sections are concave as seen from the luggage intermediate part and form receptacle channels, each of which is arranged to receive one of the tension elements.

17. The saddlebag as claimed in claim 16, wherein latch elements which are engageable in the catch mechanisms of the luggage interior part are provided at the latch ends of the tension elements which protrude out of the receptacle channels formed by the belt-like sections.

18. The saddlebag as claimed in claim 15, wherein the at least one reinforcing element has a belt-like section which extends forward across the two other belt-like sections from the back side to the front side of the luggage exterior part.

19. The saddlebag as claimed in claim 13, wherein the belt-like sections are made of plastic.

20. The saddlebag as claimed in claim 13, wherein the belt-like sections are more rigid than the luggage exterior part.

* * * * *